United States Patent Office 3,718,611
Patented Feb. 27, 1973

3,718,611
URETHANE FOAMS CONTAINING HALOGEN CONTAINING POLYMERS AND METHODS FOR PREPARING THE SAME USING CERTAIN CATALYSTS
Edwin M. Maxey, Stow, and John T. Harrington, Akron, Ohio, assignors to The General Tire & Rubber Company
No Drawing. Filed Apr. 24, 1969, Ser. No. 819,087
Int. Cl. C08g 41/04, 22/38
U.S. Cl. 260—2.5 BE
22 Claims

ABSTRACT OF THE DISCLOSURE

The discoloration of low density, flexible polyurethane foams containing halogen containing polymers such as polyvinyl chloride is reduced or prevented by using certain sterically hindered tertiary amines as catalysts, i.e., those containing a well-shielded nitrogen atom, for example, N-methyl dicyclohexyl amine.

BACKGROUND OF THE INVENTION

Flexible polyurethane foams have been used for many years in the manufacture of mattresses for beds and cushions for sofas and the like. However, it is not practical to produce very low densities and consequently very light foams, since the load bearing properties decrease considerably. In an attempt to overcome this problem, polyvinyl chloride has been added to the foam formulations. When polyvinyl chloride is added to a conventional formulation including the usual tertiary amines, water, and metal containing catalysts and the formulation is run on production equipment as commercially used to form buns (loaves or slabs) having, for example, a cross section of about 30 x 76 inches and a length of about 40 feet or more, the foam discolors (dark brown or purple) so severely in the center of the cross section of the bun as to be virtually unsalable comercially.

The only external heat applied to the bun as it moves down the conveyor is that received when it passes through an oven at a speed of about 5 to 12 feet/min. and at a temperature of about 180° F. for the purpose of reducing or eliminating surface tack so that the outside paper can readily be removed without tearing large chunks from the foam.

At the end of the conveyor the buns are removed and stored for about 24 hours without any external heat being applied to permit the foam to finally cure or stabilize by itself. Then the foam is slit into mattress size units or into other sizes for further manufacturing operations. Even at this time the temperature of the center of the bun is well above room temperature.

The exothermic heat of reaction of the foam forming ingredients during foaming reaches temperatures of from about 270 to 320° F. These temperatures are determined by a pyrometer probe at the end of the conveyor line and can be higher than shown considering that the mass of the pyrometer is greater than that of the surrounding foam.

On the other hand, when making molded polyurethane foams (for example bucket seats for automobiles, tractor seats, truck seats, furniture seats and the like which may have a thickness of from 1 to 6 inches, a width of up to about 20 inches and a length of up to about 6 feet), the production cycle time from pouring the foam into the mold having a cover up to removal of the molded foam from the mold can vary from about 25 to 35 minutes. Since such small amounts of foaming ingredients are employed, it is necessary to heat the molds by passing them through an oven for most of the cycle to a temperature of from about 275 to 325° F. to cause the required blowing and crosslinking reactions to advance rapidly in order to reduce surface tack and adequately cure the foam and so that the foam can be removed from the mold without tearing. After the foam has been removed from the mold, the mold is subjected to a water spray to cool it. While here the exothermic heat generated by the foam is generally less than that observed when making foam buns, additional heat is applied to accelerate the reaction so that the total heat involved with respect to the molded foam approaches or is equal to that observed with respect to the buns. It will be appreciated that the applied heat is necessary if the speed of production is to be maintained and molded foams are to be produced economically. Here, again, discoloration (purpling) of the foam occurs when polyvinyl chloride is added to the foam mixture using conventional tertiary amines, water, metal containing catalysts and the like.

Accordingly, it is a primary object of this invention to avoid the difficulties alluded to above, and to provide flexible, low density polyurethane foams containing halogen containing polymers and which have the desired load bearing characteristics and which exhibit resistance to or freedom from discoloration after foaming and to provide a method for making the same.

These and other objects and advantages of the present invention will become more apparent to those skilled in the art from the following detailed description and examples.

SUMMARY OF THE INVENTION

According to the present invention it has been discovered that certain sterically hindered tertiary amines (those containing a well shielded nitrogen atom) can be added in the customary amounts to polyetherpolyol— or polyester polyol-polyisocyanate formulations containing water and a halogen containing resin to obtain low density, flexible polyurethanes which have improved load bearing characteristics and in which the discoloration due to the resin is reduced or eliminated.

DESCRIPTION OF THE PREFERRED EMBODIMENTS

The polyurethane foaming composition or formulation should contain at least one sterically hindered tertiary amine selected from the group consisting of

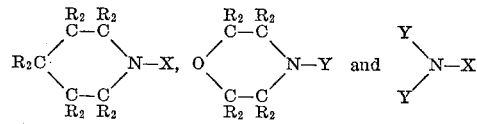

Where X is selected from the group consisting of alkyl or alkenyl radicals having from 1 to 18 carbon atoms, alkylene and alkyl substituted and unsubstituted cycloaliphatic hydrocarbon radicals having a ring of from 4 to 8 carbon atoms and up to a total of 16 carbon atoms, alkylene and alkyl substituted and unsubstituted aromatic hydrocarbon radicals containing one benzene ring and from 6 to 16 carbon atoms;

Where Y is selected from the group consisting of alkyl and alkylene substitued and unsubstituted cycloaliphatic hydrocarbon radicals hiving a ring of from 4 to 8 carbon atoms and up to a total of 16 carbon atoms and alkyl and alkylene substituted and unsubstituted aromatic hydrocarbon radicals containing one benzene ring and from 6 to 16 carbon atoms; and Where R is hydrogen or an alkyl radical of from 1 to 4 carbon atoms, the maximum number of said alkyl radicals being 4.

Examples of such sterically hindered tertiary amines are N-hexyl dicyclohexyl amine; methyl dicyclohexyl amine; butyl dicyclohexylamine; octadecyl dicyclohexylamine; ethyl cyclohexyl phenylamine; dicyclohexyl phenyl amine; triphenyl amine; N,N-dibenzyl aniline; dibenzyl cyclohexylamine; tricyclohexylamine; tricyclooctyl amine; tri(1-cyclohexyl-ethyl-2)amine; di(tert-butyl-cyclohexyl) methyl amine; (2-ethyl-1-hexenyl)diphenyl amine; 1(2-ethyl-1-hexenyl)piperidine; 1(tolyl)piperidine; 1(cyclobutyl)-3-butyl piperidine; 1(cycloheptyl)-2,3,6-trimethyl piperidine; 1(cyclohexyl)-2,2,6,6-tetramethyl piperidine; N-phenyl dicyclohexyl amine; N-p-tolyl dicyclohexyl amine; N-benzyl dicyclohexyl amine; N-methyl diphenyl amine; 4(cyclopentyl)morpholine; 4-(cyclohexyl)-2,6-dimethyl morpholine; 4(benzyl)morpholine; 4(m-cumenyl)morpholine and the like and mixtures thereof. The tertiary amines are well known and can be made by known processes; for example, they can be prepared by methods shown by Fieser and Fieser, "Organic Chemistry," D. C. Heath and Company, Boston, 1944.

These hindered tertiary amines are used in an amount of from about 0.05 to 3.2 parts by weight based on 100 parts by weight of the polyol. In the case of the polyether polyols where a metal catalyst is used for the urethane forming reaction, it is preferred to use only from about 0.05 to 0.9 part by weight of the amine per 100 parts by weight of the polyether polyol. On the other hand, in the case of the polyesterpolyols where the tertiary amine is taking care of both the foaming ($H_2O+NCO$) and network ($-ROH+NCO$) reactions, the tertiary amines should be used in an amount of from about 0.9 to 3.2 parts by weight based on 100 parts by weight of the polyesterpolyol.

The halogen containing solid polymeric resins include polymers of vinyl chloride, vinyl bromide, vinyl fluoride and vinylidene chloride and mixtures of these monomers as well as copolymers of a predominating molar amount of one or more of these monomers and a minor amount of vinyl acetate, acrylonitrile, methacrylonitrile, dimethyl or diethyl maleate or fumarate, methyl acrylate, methyl methacrylate, ethyl ethacrylate, vinyl stearate and the like and mixtures thereof. Still other halogene containing resins can be used such as hydrolyzed or partially hydrolyzed copolymers of a major amount of the vinyl halide and a minor amount of vinyl acetate. Moreover, other resins can be used such as chlorinated rubber, chlorinated polyethylene, chlorinated polyvinyl chloride, polytetrafluoroethylene and the like. Mixtures of the halogen containing polymeric resins can be used. These halogen containing resins should be finely divided (powders from about 0.0001 to 2 mm.) and have an intrinsic viscosity of from about 0.5 to 2.5, preferably from about 0.5 to 1.5. The halogen containing resins are used in an amount effective to obtain the desired load bearing characteristics; generally they are used in an amount of from about 2 to 100 parts by weight, preferably from about 5 to 30 parts by weight, per 100 parts by weight of the polyol. The halogen containing resins can be made by bulk, solvent, emulsion or suspension polymerization processes. It is preferred to use halogen containing resins made by the emulsion polymerization process. Of these halogen containing resins it also is preferred to employ polyvinyl chloride, especially emulsion polymerized polyvinyl chloride (plastisol grade).

Polyols used in making the polyurethanes of the present invention are primary and secondary hydroxy terminated polyoxyalkylene ethers and polyesters having from 2 to 4 hydroxyl groups and a molecular weight of from about 1,000 to 10,000. They are liquids or are capable of being liquefied or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl. Among the polyoxyalkylene polyols which are useful in the practice of this invention are the polyethylene glycols, the polypropylene glycols, and polybutylene ether glycols. Polymers and copolymers of polyoxyalkylene polyols are also adaptable in the process of this invention as well as the block copolymers of ethylene oxide and propylene oxide. Among the copolymers of polyoxyalkylene polyols that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3, glycerol, 1,2,6-hexanetriol, trimethylolpropane, trimethylolethane, tris(hydroxyphenyl)propane, triethanolamine, triisopropanolamine, ethylenediamine, and ethanolamine. Linear and branched heteric copolyethers of ethylene oxide and propylene oxide are also useful in making the foamed products of this invention with the preferred one being those end blocked with ethylene oxide to provide primary hydroxyl groups in the polymer and having molecular weights of from about 2000 to 5000.

Further useful types of polyetherpolyols are block copolymers prepared from propylene oxide and ethylene oxide. These polyethers can be characterized by reference to the following general formulae:

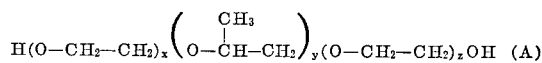

and

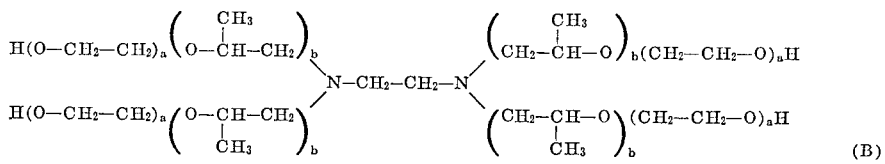

where in Formula A the total of subscripts, $x$, $y$, and $z$ represent positive integers in the range of from 22 to 70 and the total of subscripts $a$ and $b$ of Formula B represent positive integers in the range of from 20 to 100.

Polyethers having a branched chain network are also useful. Such branched chain polyethers are readily prepared from alkylene oxides of the type above described and initiators having a functionality greater than two. Branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer. Mixtures of polyether polyols can be used.

Polyester polyols used in the practice of the present invention are made by the reaction of a major amount of a glycol and a minor amount of a dicarboxylic acid. Where branching is desired to get the required network in the urethane foam, a minor amount of a triol is employed. The total OH functionality is greater than the COOH functionality so that OH terminated polyesters are produced. Representative polyesters include polyesters prepared from ethylene glycol and adipic acid; propylene glycol and adipic acid; ethylene glycol, propylene glycol and adipic acid; ethylene glycol, propylene glycol-1,2 and azelaic acid; ethylene glycol, propylene glycol-1,2 and sebacic acid; ethylene glycol, propylene glycol-1,2 and dilinoleic acid; ethylene glycol, glycerine and adipic acid; ethylene glycol, butylene glycol-1,4 and adipic acid; propylene glycol-1,3, trimethylol propane and adipic acid; ethylene glycol, pentanediol-1,4 and adipic acid; ethylene glycol, glycerine monoisopropyl ether and adipic acid; propylene glycol-1,2, 1,2,6-hexane triol, and adipic acid; ethylene glycol, propylene glycol-1,2, maleic acid, and adipic acid; ethylene glycol, dipropylene glycol and adipic acid; butylene glycol, propylene glycol-1,2 and adipic acid; ethylene glycol, butylene glycol-1,4 and sebacic acid; propylene glycol, diethylene glycol and adipic acid; ethylene glycol, propylene glycol-1,2 and adipic acid; diethylene glycol, propylene glycol-1,2 and azelaic acid, and the like.

These polyesters are reaction products of polyols, such as the aforementioned aliphatic polyols and in particular the class of aliphatic polyols containing from two to ten carbon atoms, with polycarboxylic acids having from two to thirty-six carbon atoms, e.g., oxalic acid, succinic acid, maleic acid, adipic acid, sebacic acid, isosebacic acids, phthalic acids, and dimer acids such as those obtaned by coupling two molecules of linoleic acid. Mixtures of polyester polyols can be used.

Likewise, there can be used as polyols grafts of ethylenically unsaturated monomers such as acrylonitrile, methacrylonitrile, vinyl acetate, methyl acrylate and the like on the polyols or polyesters and having the functionality and molecular weight as shown above. Such graft polyols and methods for making the same are shown in the U.S. patents to Stamberger, Nos. 3,304,273 and 3,383,351 and in the U.S. patent to Von Bonin, No. 3,294,711.

When desired, cross-linking materials having from 2 to 8 hydroxyl groups can be included in the foam formulations to increase cross-link density and so forth. They have molecular weights of from about 60 to 600. Only small amounts of such materials are generally needed (about 0.3 to 10 mols per 100 mols of polyol). Examples of such crosslinking agents are glycol, diethylene glycol, propylene glycol, butane diol-1,4, dipropylene glycol, glycerol, trimethylolpropane, butanetriols, hexanetriols, trimethylolphenol, tris(hydroxyphenyl)propane, tris(hydroxyxylyl)propane, various tetrols, such as erythritol and pentaerythritol; pentols; hexols, such as dipentaerythritol and sorbitol, as well as alkyl glucosides, carbohydrates, polyhydroxy fatty acid esters such as castor oil, and polyoxyalkylated derivatives or polyfunctional compounds having three or more reactive hydrogen atoms, such as, for example, the reaction product of trimethylolpropane, glycerol, 1,2,6-hexane triol, sorbitol and other polyols with ethylene oxide, propylene oxide or other alkylene epoxide or copolymers thereof, e.g., copolymers of ethylene and propylene oxides. Grafter crosslinkers can be prepared by the processes of the aforementioned Stamberger and Von Bonin U.S. patents. Mixtures of cross-linkers can be used. The crosslinkers, polyethers, polyesters and graft polyols of the same as well as the polyisocyanates disclosed herein, i.e., the polymer forming materials, should be free of amino groups or, if they are present, they should be sterically hindered or shielded.

Any organic di- or tri-isocyanate can be used in the practice of the present invention. Diisocyanates are preferred, particularly when there is any considerable amount of branching in the polyol or crosslinker to avoid the formation of rigid or semi rigid foams and vice versa. Examples of suitable organic polyisocyanates to use are ethylene diisocyanate, trimethylene diisocyanate, tetramethylene diisocyanate, pentamethylene diisocyanate, butylene - 1,2 - diisocyanate, butylene - 1,3 - diisocyanate, hexamethylene diisocyanate, propylene-1,2-diisocyanate, butylene - 1,2 - diisocyanate, butylene-1,3-diisocyanate, butylene-2,3-diisocyanate, alkylidene diisocyanates such as ethylidine diisocyanate and butylidine diisocyanate; cycloalkylene diisocyanates such as cyclopentylene-1,3-diisocyanate, cyclohexylene-1,2-diisocyanate, cyclohexylene-1,3 - diisocyanate, and cyclohexylene - 1,4 - diisocyanate; cycloalkylidene diisocyanates such as cyclopentylidene diisocyanate and cyclohexylidene diisocyanate; aromatic diisocyanates such as m-phenylene diisocyanate, p-phenylene diisocyanate, polymethylene polyphenylisocyanate, 2,4 - tolylene diisocyanate, 2,6 - tolylene diisocyanate, bitolylene diisocyanate, naphthalene-1,4-diisocyanate, and diphenylene-4,4'-diisocyanate; aliphatic-aromatic diisocyanates such as xylylene-1,4-diisocyanate, xylylene-1,3-diisocyanate, bis(4 - isocyanato - phenyl)methane, bis(3-methyl-4-isocyanatophenyl)methane, and 4,4'-diphenylpropane diisocyanate, durylene diisocyanate, 4,4',4''-tris (isocyanatophenyl)methane, 3,10 - diisocyanatotricyclo [$5.2.1.0^{2,6}$] decane, bis-(2-isocyanatoethyl)carbonate, and naphthalene triisocyanate and the like. Mixtures of polyisocyanates can be used.

The amount of polyisocyanate employed ranges from aabout 0.70 to 1.35 total mols of NCO (in the polyisocyanates) per total mol of active hydrogen (as determined by the Zerewitinoff method, J.A.C.S., vol. 49, p. 3181 (1927)) in the polyols, crosslinkers, water, halogen containing resins (such as partially hydrolyzed vinyl chloride-vinyl acetate copolymers) and any other active hydrogen containing material in the polyurethane foam formulation.

Water is used as a blowing agent and is employed in amounts of from about 1.5 to 5 parts by weight per 100 parts by weight of the polyol.

The water should be substantially or essentially pure, that is, it should be free of impurities such as ions, sols, etc. of mineral, vegetable, or synthetic origin and the like which would adversely affect the foaming action or the properties of the resultant polyurethane foam. Deionized, distilled or otherwise purified water should be employed.

If lower density and softer foams are desired there additionally can be added to the polyurethane foam formulation separately or in admixture with one of the other components, i.e., polyol or polyisocyanate, etc., up to about 25 parts by weight of a fluorocarbon blowing agent per 100 parts by weight of the polyol. Examples of such blowing agents are those fluorine substituted aliphatic hydrocarbons which have boiling points between about $-40°$ C. and $+170°$ C., and which vaporize at or below the temperature of the foaming mass. The blowing agents include, for example, trichloromonofluoromethane, dichlorodifluoromethane, dichloromonofluoromethane, bromotrifluoromethane, chlorodifluoromethane, 1,1-dichloro-1-fluoroethane, 1,1-difluoro-1,2,2-trichloroethane, chloropentafluoroethane, 1-chloro-1-fluoroethane, 1 - chloro - 2 - fluoroethane, 1,1,2-trichloro-1,2,2-trifluoroethane, 1,1,1 - trichloro - 2,2,2 - trifluoroethane, 2-chlorononafluorobutane, hexafluorocyclobutene, and octafluorocyclobutane. Still other easily vaporizable fluorocarbons can be used. Mixtures of the fluorocarbons can be used. Still other blowing agents can be used in full or partial replacement of the fluorocarbons such as propane, butane, pentane, pentene, hexane and so forth and mixtures thereof, particularly where precautions are taken to prevent explosions or where removal of the gases is provided. See U.S. patents Nos. 3,072,582 and 3,391,093.

Catalysts for the polyetherpolyol-polyisocyanate reaction can be any catalyst heretofore used in the art particularly the metal containing catalysts. Examples of such catalysts are (1) teritary phosphines such as trialkylphosphines, dialkylbenzylphosphines, and the like; (2) strong bases such as the alkali and alkaline earth metal hydroxides, alkoxides, and phenoxides; (3) acidic metal salts of strong acids such as ferric chloride, stannic chloride, stannous chloride, antimony trichloride, bismuth nitrate, bismuth chloride, and the like; (4) chelates of various metals such as those which can be obtained from acetylacetone, benzoylacetone, trifluoroacetylacetone, ethyl acetoacetate, salicylaldehyde, cyclopentanone-2-carboxylate, and the like, with various metals such as Be, Mg, Zn, Cd, Pb, Ti, Zr, Sn, As, Bi, Cr, Mo, Mn, Fe, Co, Ni, or ions as $MoO_2^{++}$ and the like; (5) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids and beta-diketones, such as the well known chelates of titanium obtained by said or equivalent procedures; (6) salts of organic acids with metals such as alkali metals, alkaline earth metals, Al, Sn, Pb, Mn, Co, Ni, and Cu, including, for example, sodium acetate, potassium laurate, calcium hexanoate, stannous acetate, stannous octoate, stannous oleate, lead octoate, metallic driers such as manganese, cobalt, and lead naphthenate and the like; (7) organometallic derivatives of tetravalent tin, trivalent and pentavalent As, Sb, and Bi, and metal carbonyls of iron and cobalt; and (8) the dialkyltin salts of carboxylic acids, e.g., dibutyltin diacetate, dibutyltin dilaurate, dibutyltin maleate, dilauryltin diacetate, dioctyltin diacetate, and the like; as well as a trialkyltin hydroxide, dialkyltin oxide, dialkyltin dialkoxide, or a dialkyltin dichloride, such as trimethyltin hydroxide, tributyltin hydroxide, trioctyltin hydroxide, dibutyltin oxide, dioctyltin oxide, dilauryltin oxide, dibutyltin-bis (isopropoxide), dibutyltin dichloride, dioctyltin dichloride, and the like and mixtures thereof. Preferred catalysts to use are the divalent tin salts of carboxylic acids having from 2 to 18 carbon atoms. These catalysts are used in an amount of from about 0.1 to 0.9 part by weight per 100 parts by weight of the polyetherpolyol. It is less preferable to use these catalysts, especially in large amounts, such as the metal salts, alcoholates, hydroxides, alkoxides and phosphines, to catalyze the polyesterpolyol-polyisocyanate reaction or where resins containing ester groups in a substantial amount are used since they tend to hydrolyze the ester linkages thereby causing scission of the backbone polymer chain and lowering of the physical and chemical properties of the resultant foam and so forth, especially under conditions of high temperature and humidity.

Surfactants or emulsifiers are necessary to provide the desired cell formation and growth. Polysiloxane-polyoxyalkylene block copolymers are preferred. Polysiloxane-polyalkylene block copolymers are described in U.S. Patents 2,834,748 and 2,917,480. Another useful class of emulsifiers are the "non-hydrolyzable" polysiloxane-polyoxalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Although the use of an emulsifier is desirable to influence the type of foam structure that is formed, the foam products of the invention can be prepared without emulsifiers. Still other polysiloxane-polyoxyalkylene copolymers known to the art may be employed as well as silicones, turkey red oil and so forth. The surfactant is used in an amount of from about 0.3 to 2.5 parts by weight per 100 parts by weight of the polyether or ester polyol.

Other well known constituents can be added to the polyurethane foam recipe such as barium and cadmium salts of carboxylic acids, clay, talc, $TiO_2$, silica and hydrated silica, $CaCO_3$, metal chromates, barytes, phthalocyanine green or blue pigments, red iron oxide, conventional stabilizers, carbon black, dyes, toners, epoxidized soy bean oil (Paraplex G–62), epoxides (Epon 828), tricresyl phosphate, zinc oxide, antimony oxide, antioxidants, fungicides, bacteriostats and the like. These constituents can be added in various amounts to the foaming ingredients to achieve the desired properties in the resultants flexible, low density foams.

The flexible, cellular urethane-vinyl chloride polymeric foams of the present invention can be used as cushions, mattresses, pillows, cushioning material for furniture and automobiles, rug underlay and especially as interior automobile door panels, head rests, and so forth.

The preparation of the polyurethane foams of the present invention can be formed by a process known in the art as the "one-shot" process or by a two step process involving, first, the preparation of a "prepolymer," the well known "semiprepolymer" or "quasiprepolymer" technique. There all or a portion of the polyol is reacted with all of the organic polyisocyanate, providing a reaction product which contains a high percentage of free isocyanate groups and which is reacted with the remaining portion of the hydroxyl terminated polyol or a crosslinker, together with water, catalysts, and the halogen containing polymer to form a rubbery, cellular, elastic product.

No matter which particular technique is used, the halogen containing polymer or resin may not only be dispersed with the polyol alone, but alternatively with the organic polyisocyanate alone. Still another method within the preview of the present invention involves dispersing the halogen containing polymer with a combination of the polyol and the organic polyisocyanate. In any case, it is advantageous to thoroughly disperse the halogen containing polymer into whatever particular initial composition is used.

It is not precisely known what occurs during the foaming reaction but it is known that in general tertiary amines do not cause any staining or discoloration of polyurethane foams. On the other hand, it has been found that when such amines are used with polyvinyl chloride, objectionable staining or discoloration occurs. This may well be due to some reaction between the amine and the polyvinyl chloride. The discoloration may be especially accelerated by the high temperatures encountered during foaming, causing decomposition of the polyvinyl chloride to form chlorine, HCl and so forth. It, therefore, was unexpected to find that certain hindered or shielded amines would still function as catalysts for the water-polyether polyol polyisocyanate reaction and as catalysts for the water-polyester polyol-polyisocyanate reaction and would not adversely affect the polyvinyl chloride or the foam. It, also, may well be true here that these particular amines are acting as chelators or scavengers to trap any by-products of the polyvinyl chloride decomposition in view of the general reactions and temperatures involved during foaming. In any event, it was surprising to find that the polyurethane system disclosed herein would provide flexible, low density foams having improved load bearing characteristics and freedom from or resistance to discoloration. Moreover, it will be appreciated that the foams of the present invention, particularly at the higher resin loadings, exhibit some heat sealing properties.

The following examples will serve to illustrate the present invention with more particularity to those skilled in the art.

EXAMPLE 1

To separate batches of 100 grams of polyoxypropylene triol having a molecular weight of 3000 were added with stirring 1.0 gram of a surfactant comprising a silicone block copolymer (Union Carbide L540), 4.0 grams of deionized water, 0.3 gram of stanous octoate and the indicated amounts of tertiary amines. The compositions were stirred until uniform whereupon 15 grams of a finely divided polyvinyl chloride resin produced by emulsion polymerization and having an intrinsic viscosity of 1.28 (Geon 121) were added to each with additional stirring until uniform dispersions were obtained. To each of the mixtures were added 52 grams of an 80:20 blend of the 2,4 and 2,6 isomers of toluene diisocyanate with additional stirring for 10 seconds. The resulting admixtures were poured into gallon containers and three minutes were allowed for the resulting foaming reactions to take place. After this, the foams were placed in an oven regulated to a temperature of 250° F. and cured at this temperature for 10 minutes to produce rubbery, resilient, load resistant cellular products which were seen to have a uniform light yellow color.

In order to test the foregoing foams, they were removed from the oven, cooled to room temperature, and each foam was cut into test pieces having dimensions of 0.5 inch by 2.0 inches by 4.0 inches. The resulting samples were left overnight at room temperature, before testing for discoloration and retention of color-uniformity at elevated temperatures. Then each foam sample was heat-aged for 64 hours in an air-circulating oven maintained at 190° F. During heat aging, the foam samples were placed in glass beakers and discoloration of each foam was checked visually and recorded. The foam recipes and test results are shown below.

| Materials | Grams | |
|---|---|---|
| | Foam A | Foam B |
| 3,000 M.W. triol | 100 | 100 |
| Surfactant | 1.0 | 1.0 |
| Water (deionized) | 4.0 | 4.0 |
| Stannous octoate | 0.3 | 0.3 |
| N-methyl dicyclohexyl amine | 0.15 | |
| N-methyl morpholine | | 0.15 |
| Triethylene diamine | | .08 |
| Toluene diisocyanate (80:20) | 52 | 52 |
| Polyvinyl chloride resin | 15 | 15 |
| Antimony oxide | 7 | 7 |
| ZnO (French process) | 3 | 3 |

After dry aging 64 hours at 190° F., foam A was found to still have a uniform light yellow color whereas foam B was beginning to display a purple color.

EXAMPLE II

The same general procedure as in Example I was repeated except that 1.2 grams of the same surfactant, 3.9 grams of deionized water and 53 grams of the 80:20 mixture of the 2,4 and 2,6 isomers of toluene diisocyanate were employed. Only the tertiary amine N-methyl dicyclohexyl amine was tested. Upon heat-aging the resulting foam at 284° F. for 4 hours, no discoloration was observed.

EXAMPLE III

The procedure of Example I was again repeated except that foam C contained 0.06 gram of a tertiary amine of the formula:

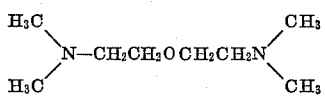

(70% by weight in dipropylene glycol) in place of the amines of Foam B. Foam D contained N-methyl dicyclohexyl amine, which was present in an amount of 0.15 gram.

Foam C discolored to form a dark brown color upon heat-aging at 284° F. for 60 minutes even when the amine was used in a small amount. Foam D did not discolor upon heat-aging at 284° F. for 60 minutes.

EXAMPLE IV

Four drops of each of the amines listed below were put on a small mound (2 g.) of PVC resin (Geon 121) on a glass plate which was placed in an air oven at 300° F. for periods of time of 15, 30 and 45 minutes with the following results:

| Tertiary amine | Color after— | | |
|---|---|---|---|
| | 15 min. | 30 min. | 45 min. |
| N-methyl dicyclohexyl amine. | Colorless | Slight yellow | Slight yellow. |
| N-coco morpholine | Lt. brown | Lt. brown | Lt. brown. |
| Dimethyl piperazine | Dk. brown | Dk. brown | Dk. brown. |
| Tetramethylpropane diamine. | Med. brown | Med. brown | Med. brown. |
| Trimethyl aminoethyl piperazine. | Dk. brown | Dk. brown | Dk. brown. |
| A mixture of 20 wt. percent triethylene diamine and 80 wt. percent dimethylethanolamine. | do | do | Purple. |
| [(CH₃)₂NCH₂CH₂]₂O | Light yellow | do | Dk. brown. |
| N,N-dimethyl ethanolamine. | do | Lt. brown | Med. brown. |
| Triethylene diamine (Dabco). | Med. yellow | do | Purple. |
| N-methyl morpholine | Med. brown | Med. brown | Med. brown. |
| Dimethyl hexadecyl amine. | Lt. yellow | Med. yellow | Do. |
| (H₃C)₂N-CH₂CH₂-CHCH₃N(CH₃)₂. | Dk. brown | Dk. brown | Purpling. |

EXAMPLE V

The method of this example was the same as that of Example IV, above, except that the amines shown below were used and heat-aging was conducted at 284° F. for 45 and 60 minutes. The results were as follows:

| Tertiary amine | Color after— | |
|---|---|---|
| | 45 min. | 60 min. |
| [(CH₃)₂NCH₂CH₂]₂O | Dark brown | Dark brown. |
| N-methyl dicyclohexyl amine | Slight yellow | Slight yellow. |
| N,N-dimethyl ethanolamine | Brown | Red-brown. |
| Triethylene diamine | Dark brown | Do. |
| N-methyl morpholine | Brown | Brown. |
| (H₃C)₂N—CH₂CH₂CHCH₃—N(CH₃)₂ | Light brown | Light brown. |
| Dimethyl hexadecyl amine | do | Dark brown. |

EXAMPLE VI

Foams E and F were prepared in accordance with the procedure of Example I except that 1.2 grams of the surfactant, 0.3 gram of triethylene diamine, 3.9 grams of deionized water, and 53 grams of the 80:20 mixture of the 2,4 and 2,6 isomers of toluene diisocyanate were used and the oxides were omitted. Foam E also contained a stain-inhibitor or chelator (1.5 gm.; XD-6; Houdry) whereas Foam F did not. The above foams were aged 7 hours, 16 hours and 24 hours at 300° F. in a dry air oven. Both foams discolored to a dark brown after 7 hours and were still dark brown after 24 hours of heat-aging. Foam E containing the added stain inhibitor showed no improvement in reducing discoloration as compared to Foam F containing no added stain inhibitor.

EXAMPLE VII

Foam G was prepared in the same way as Foam F except that in place of triethylene diamine 0.3 gram of 1 - (2 - ethyl-1-hexenyl)piperidine was employed as the amine catalyst, and the surfactant was used in an amount of 1.2 grams, the water in an amount of 3.9 grams and the T.D.I. in an amount of 53 grams. The resulting foam after 24 hours at 300° F. exhibited a light brown color. Following the same procedure but using other amines in place of the piperidine compound, tests of the foams after aging 24 hours at 300° F. gave the following results:

N-cyclohexylmorpholine _____ Yellow to tan color.
Tricyclohexyl amine _____ Tan color.

N-cyclohexyl diethanol amine __ Light brown color.

Note that the control foam using triethylene diamine was dark brown after 7 hours.

EXAMPLE VIII

Foams were prepared in accordance with the procedure of Example VII using as the amine 0.3 gram of several different tertiary amines. The resulting foams were aged for 16 hours at 300° F. with the following results:

| Amine: | Foam color |
|---|---|
| Tri-n-octylamine | Med. Brown. |
| N,N-dimethyl aniline | Lt. yellow. |
| N-methyl diphenyl amine | Lt. yellow. |
| N,N-dibenzyl aniline | Lt. yellow. |

EXAMPLE IX

The same general procedure as in Example I was repeated using a basic composition of 100 grams of a 3500 molecular weight primary hydroxyl terminated polyether triol, 20 grams of a particulate, suspension polymerized polyvinyl chloride polymer with an intrinsic viscosity of about 0.70, the surfactant and deionized water as previously recited, and 48.5 grams of the tolylene diisocyanate isomer blend, with the omission of the metal oxides. In one foam composition 0.3 gram of triethylene diamine was added to the basic composition together with 0.3 gram of stannous octoate. In the other foam mixture 0.3 gram of N-methyl dicyclohexyl amine was used, also together with 0.3 gram of stannous octoate.

Heat aging of the resulting foams was for 1 hour at 140° C. with the following results as to foam color after heat-aging.

| Amine: | Foam color |
|---|---|
| Triethylene diamine | Sl. brown. |
| N-methyl dicyclohexyl amine | No discoloration. |

EXAMPLE X

Foams were prepared in accordance with Example IX except that the vinyl chloride polymer in this example consisted of partially hydrolyzed vinyl chloride-vinyl acetate copolymer (91% vinyl chloride, 3% vinyl acetate, and 5.9% vinyl alcohol from hydrolyzed vinyl acetate (VAGH, Union Carbide)). Two different tertiary amines were employed in an amount of 0.15 gram each together with the 0.3 gram of stannous octoate.

The resulting foams were heat-aged at 140° F. for one hour and the extent of discoloration was evaluated as follows:

| Amine: | Foam color |
|---|---|
| Triethylene diamine | Slightly brown. |
| N-methyl dicyclohexyl amine | No discoloration. |

EXAMPLE XI

When two foams are prepared in accordance with Example I using as a basic recipe 100 grams of a polyester polyol (slightly branched adipic acid-diethylene glycol polyester, hydroxyl No. of 52, M.W. about 2150, Witco Fomrez 50), 0.5 gram of a silicone surfactant (L532, Union Carbide), 3.8 grams of deionized water, 15 grams of polyvinyl chloride resin and 45 grams of the 80:20 isomer blend of toluene diisocyanate, one foam using as its only catalyst 1.9 grams of N-methyl morpholine and the other foam using as its only catalyst 1.7 grams of N-methyl dicyclohexyl amine, and the respective foams are heated-aged for one hour at 140° C., the foam catalyzed by N-methyl morpholine turns slightly brown but the other foam shows no apparent discoloration.

EXAMPLE XII

Foams were prepared according to the foregoing procedures and were tested after foaming and after aging.

The foaming ingredients (parts by weight) and results obtained are shown below:

| Ingredient | H | I |
|---|---|---|
| Polyether triol (m.w. about 3500, Thanol F-3514) | 100 | 100 |
| $H_2O$, deionized | 4 | 4 |
| Surfactant (L540) | 1 | 1 |
| Stannous octoate | .3 | .3 |
| Chlorinated polyethylene (48% chlorine, QX-2243.25, Dow Chemical) | 20 | |
| Copolymer of about 86% vinyl chloride and 14% vinyl acetate (VYHH, Union Carbide) | | 20 |
| Toluene diisocyanate (80/20, 2,4/2,6) | 48.5 | 48.5 |
| Methyl dicyclohexyl amine | .15 | .1e |
| Initial discoloration | None | Non5 |
| After 24 hours at 140° C. in an air oven | (¹) | (²) |

¹ Light brown.  ² Medium brown.

EXAMPLE XIII

Additional flexible, low density polyetherurethane foams were prepared by the one-shot process and tested as shown below, the parts shown being parts by weight:

| Materials | A | B | C | D |
|---|---|---|---|---|
| Polypropylene ether triol (3,000 m.w., sec. hydroxyl groups (G 3030 PG)) | 100 | 100 | 100 | 100 |
| Polysiloxane-polyoxyalkylene block copolymer surfactant (L540) | 1 | 1 | 1 | 1 |
| Water, deionized | 4 | 4 | 4 | 4 |
| Stannous octoate | 0.3 | 0.3 | 0.3 | 0.3 |
| Methyl dicyclohexyl amine | 0.15 | 0.15 | | |
| Triphenyl amine | | | 0.30 | |
| N-cyclohexyl piperdine | | | | 0.30 |
| Toiylene diisocyanate (80,20-,2,6/2,4-) | 52 | 52 | 52 | 52 |
| Polyvinyl chloride, emulsion process (Geon 121) | | 15 | 15 | 15 |
| Cream time (seconds) | 16 | 13 | 21 | 14 |
| Rise time (seconds) | 113 | 123 | 177 | 105 |
| Density (lbs./ft.³) | 2.0 | 2.1 | 2.2 | 2.0 |
| Resilience of foam, percent | 36 | 40 | 37 | 42 |
| After curing in air oven at 250° F. for 10 minutes compression load deflection (Sample 4″ x 4″ x 2″): | | | | |
| Height, inches | 2 | 2 | 2 | 2 |
| Load in pounds required to deflect sample 25% | 10 | 10.4 | 11.8 | 9.2 |
| Load in pounds required to deflect sample 65% | 18.2 | 21.4 | 26.0 | 19.8 |
| After curing in air oven at 250° F. for 16 hours compression load deflection (Sample 4″ x 4″ x 2″): | | | | |
| Height, inches | 2 | 2 | 2 | 2 |
| Load in pounds required to deflect sample 25% | 8.5 | 12.3 | 15.5 | 10.5 |
| Load in pounds required to deflect sample 65% | 17.2 | 25.1 | 29.9 | 22.8 |
| Color | (¹) | (²) | (²) | (²) |

¹ Slightly yellow.  ² Slight tan.

In contract to many fillers in foams, it is seen that the load bearing characteristics of the foams containing the finely divided PVC are enhanced after extensive aging.

The embodiments of the invention in which an exclusive property or privilege is claimed are defined as follows:

1. In the method of making a flexible, low density polyurethane foam by the reaction of (A) a polyol having from two to four hydroxyl groups, having a molecular weight of from about 1000 to 10,000 and being selected from the group consisting of polyether polyols and polyesterpolyols, (B) an organic polyisocyanate and (C) a blowing agent comprising water in admixture with (D) a surfactant, the mol ratio of —NCO groups to active hydrogen groups being from about 0.70:1 to 1.35:1 using the one-shot or prepolymer process, the improvement comprising incorporating in said formulation (I) from about 2 to 100 parts by weight per 100 parts by weight of said polyol of a finely divided, solid halogen containing polymeric resin having an intrinsic viscosity of from about 0.5 to 2.5, and (II), in an amount of from about 0.05 to 3.2 parts by weight per 100 parts by weight of said polyol, a catalyst comprising at least one sterically hindered tertiary amine selected from the group consisting of

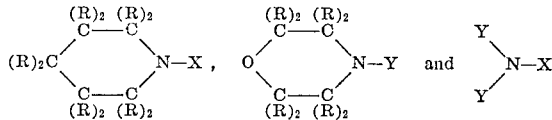

where X is selected from the group consisting of alkyl or alkenyl radicals having from 1 to 18 carbon atoms, unsubstituted cycloaliphatic hydrocarbon radicals, alkyl substituted cycloaliphatic hydrocarbon radicals and cycloaliphatic alkylene hydrocarbon radicals, said cycloaliphatic radicals having a ring of from 4 to 8 carbon atoms and up to a total of 16 carbon atoms, unsubstituted aromatic hydrocarbon radicals, alkyl substituted aromatic hydrocarbon radicals and aromatic alkylene hydrocarbon radicals, said aromatic radicals containing one benzene ring and from 6 to 16 carbon atoms;

where Y is selected from the group consisting of unsubstituted cycloaliphatic hydrocarbon radicals, alkyl substituted cycloaliphatic hydrocarbon radicals and cycloaliphatic alkylene hydrocarbon radicals, said cycloaliphatic radicals having a ring of from 4 to 8 carbon atoms and up to a total of 16 carbon atoms and unsubstituted aromatic hydrocarbon radicals, alkyl substituted aromatic hydrocarbon radicals and aromatic alkylene hydrocarbon radicals, said aromatic radicals containing one benzene ring and from 6 to 16 carbon atoms; and where R is hydrogen or an alkyl radical of from 1 to 4 carbon atoms, the maximum number of said alkyl radicals being 4, to provide a foam exhibiting improved load bearing characteristics and improved resistance to discoloration.

2. The method according to claim 1 in which the polyol is a polyalkylene ether polyol, said tertiary amine is present in an amount of from about 0.05 to 0.9 part by weight per 100 parts by weight of said polyol and said catalyst includes from about 0.1 to 0.9 part by weight per 100 parts by weight of said polyol of a metal containing polyurethane catalyst.

3. The method according to claim 2 in which the resin is selected from the group consisting of polyvinyl chloride, a copolymer of a major amount of vinyl chloride and a minor amount of vinyl acetate, a partially hydrolyzed copolymer of a major amount of vinyl chloride and a minor amount of vinyl acetate, and chlorinated polyethylene and in which said resin is used in an amount of from about 5 to 30 parts by weight per 100 parts by weight of the polyol.

4. The method according to claim 3 in which the resin is polyvinyl chloride made by emulsion polymerization.

5. The method according to claim 4 in which the tertiary amine is N-methyl dicyclohexyl amine and the metal containing catalyst is stannous octoate.

6. The method according to claim 4 in which the tertiary amine is N-cyclohexyl morpholine and the metal containing compound is stannous octoate.

7. The method according to claim 4 in which the tertiary amine is tricyclohexylamine and the metal containing compound is stannous octoate.

8. The method according to claim 4 in which the tertiary amine is 1-(2-ethyl-1-hexenyl)piperdine and the metal containing compound is stannous octotate.

9. The method according to claim 3 in which the resin is a copolymer of a major amount of vinyl chloride and a minor amount of vinyl acetate, the tertiary amine is N-methyl dicyclohexyl amine, and the metal containing compound is stannous octoate.

10. The method according to claim 9 in which the copolymer has been partially hydrolyzed.

11. The method according to claim 3 in which the resin is chlorinated polyethylene, the tertiary amine is methyl dicyclohexyl amaine, and the metal containing compound is stannous octoate.

12. A low density, flexible polyurethane foam selected from the group consisting of polyetherurethane and polyesterurethane foams, the ether and ester moieties of said foams being derived from polyols having a molecular weight of from about 1,000 to 10,000, said cycloaliphatic foam containing (I) from about 2 to 100 parts by weight per 100 parts by weight of the polyol of a finely divided, solid halogen containing polymeric resin having an intrinsic viscosity of from about 0.5 to 2.5 and (II) from about 0.05 to 3.2 parts by weight per 100 parts by weight of the polyol of a catalyst comprising at least one sterically hindered tertiary amine selected from the group consisting of

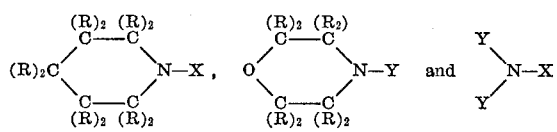

where X is selected from the group consisting of alkyl or alkenyl radicals having from 1 to 18 carbon atoms, unsubstituted cycloaliphatic hydrocarbon radicals, alkyl substituted cycloaliphatic hydrocarbon radicals and cycloaliphatic alkylene hydrocarbon radicals, said cycloaliphatic radicals having a ring of from 4 to 8 carbon atoms and up to a total of 16 carbon atoms, and unsubstituted aromatic hydrocarbon radicals, alkyl substituted aromatic hydrocarbon radicals and aromatic alkylene hydrocarbon radicals, said aromatic radicals containing one benzene ring and from 6 to 16 carbon atoms;

where Y is selected from the group consisting of unsubstituted cycloaliphatic hydrocarbon radicals, alkyl substituted cycloaliphatic hydrocarbon radicals and cycloaliphatic alkylene hydrocarbon radicals, said cycloaliphatic radicals having a ring of from 4 to 8 carbon atoms and up to a total of 16 carbon atoms and unsubstituted aromatic hydrocarbon radicals, alkyl substituted aromatic hydrocarbon radicals and aromatic alkylene hydrocarbon radicals, said aromatic radicals containing one benzene ring and from 6 to 16 carbon atoms; and where R is hydrogen or an alkyl radical of from 1 to 4 carbon atoms, the maximum number of said alkyl radicals being 4, said foam exhibiting improved load bearing characteristics and improved resistance to discoloration.

13. A foam according to claim 12 in which the polyol is a polyalkylene ether polyol, said tertiary amine is present in an amount of from about 0.05 to 0.9 part by weight per 100 parts by weight of said polyol and said catalyst includes from about 0.1 to 0.9 part by weight per 100 parts by weight of said polyol of a metal containing polyurethane catalyst.

14. A foam according to claim 13 in which the resin is selected from the group consisting of polyvinyl chloride, a copolymer of a major amount of vinyl chloride and a minor amount of vinyl acetate, a partially hydrolyzed copolymer of a major amount of vinyl chloride and a minor amount of vinyl acetate, and chlorinated polyethylene and in which said resin is used in an amount of from about 5 to 30 parts by weight per 100 parts by weight of the polyol.

15. A foam according to claim 14 in which the resin is polyvinyl chloride made by emulsion polymerization.

16. A foam according to claim 15 in which the tertiary amine is N-methyl dicyclohexyl amine and the metal containing catalyst is stannous octoate.

17. A foam according to claim 15 in which the tertiary amine is N-cyclohexyl morpholine and the metal containing compound is stannous octoate.

18. A foam according to claim 15 in which the tertiary amine is tricyclohexyl amine and the metal containing compound is stannous octoate.

19. A foam according to claim 15 in which the tertiary amine is 1-(2-ethyl-1-hexenyl)piperidine and the metal containing compound is stannnous octoate.

20. A foam according to claim 14 in which the resin is a copolymer of a major amount of vinyl chloride and a minor amount of vinyl acetate, the tertiary amine is N-methyl dicyclohexyl amine, and the metal containing compound is stannous octoate.

21. A foam according to claim 20 in which the copolymer has been partially hydrolyzed.

22. A foam according to claim 14 in which the resin is chlorinated polyethylene, the tertiary amine is methyl dicyclohexyl amine, and the metal containing compound is stannous octoate.

References Cited

UNITED STATES PATENTS 3,075,928   1/1963   Lanham _____ 260—2.5

DONALD E. CZAJA, Primary Examiner

C. W. IVY, Assistant Examiner

U.S. Cl. X.R.

260—2.5 AC, 2.5 BB, 2.5 AJ

PO-1050
(5/69)

UNITED STATES PATENT OFFICE
CERTIFICATE OF CORRECTION

Patent No. 3,718,611  Dated February 27, 1973

Inventor(s) Edwin M. Maxey and John T. Harrington

It is certified that error appears in the above-identified patent and that said Letters Patent are hereby corrected as shown below:

Column 3, line 50, which reads: "halogene" should read ---halogen---.

Column 6, line 19, which reads: "aabout" should read ---about---.

Column 8, line 68, which reads: "sepaarte" should read ---separate---.

Column 12, line 12, under I, which reads: ".le" should read ---.15---.

Column 12, line 13, under I, which reads: "Non5" should read ---None---.

Column 12, line 48, which reads: "contract" should read ---contrast---.

Column 13, line 59, which reads: "octotate" should read ---octoate---.

Column 13, line 69, which reads: "amaine" should read ---amine---.

Signed and sealed this 20th day of November 1973.

(SEAL)
Attest:

EDWARD M. FLETCHER, JR.
Attesting Officer

RENE D. TEGTMEYER
Acting Commissioner of Patents